United States Patent
Kaneko et al.

(10) Patent No.: US 6,600,567 B2
(45) Date of Patent: Jul. 29, 2003

(54) METHOD AND APPARATUS FOR INSPECTING APPEARANCE AND SHAPE OF SUBJECT BODY

(75) Inventors: Tomoyuki Kaneko, Kodaira (JP); Tokuhiro Murayama, Kodaira (JP); Tsuneo Kobayashi, Kodaira (JP); Takao Kokubu, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/737,796

(22) Filed: Dec. 18, 2000

(65) Prior Publication Data

US 2001/0024279 A1 Sep. 27, 2001

(30) Foreign Application Priority Data

Dec. 28, 1999 (JP) .............................. 11-374967
Oct. 31, 2000 (JP) ........................... 2000-331958

(51) Int. Cl.⁷ .............................................. G01B 11/24
(52) U.S. Cl. ..................................................... 356/601
(58) Field of Search ................................ 356/601–615, 356/625–640, 155, 457, 401, 121, 458, 520, 512, 237.1, 139.09, 28.5, 35.5; 378/196, 61, 56–58, 98.3; 33/288, 203.18, 203.16

(56) References Cited

U.S. PATENT DOCUMENTS 5,054,918 A * 10/1991 Downing et al. .............. 33/203
6,291,816 B1 * 9/2001 Liu ............................. 250/234

FOREIGN PATENT DOCUMENTS

| EP | 0 312 046 | 4/1989 | |
| EP | 0 898 163 A1 * | 2/1997 | |
| EP | 0 898 163 A1 | 2/1999 | |
| EP | 0 915 328 A2 | 5/1999 | |
| JP | 11-138654 | 5/1999 | ........... B29D/30/08 |

* cited by examiner

Primary Examiner—Tu T. Nguyen
(74) Attorney, Agent, or Firm—Sughrue Mion, PLLC (57) ABSTRACT

A method and an apparatus for inspecting appearance and shape of a subject body is provided. Installation cost and installation space are reduced, working efficiency is superior and judgement accuracy is high. A first picture taking structure takes a picture of a linear portion of a subject body lighted by a first slit light to obtain appearance data, and a second picture taking structure takes a picture of the same linear portion lighted by a second slit light to obtain shape data. The quality of appearance and shape of the subject body is judged based on the appearance data and the shape data.

7 Claims, 6 Drawing Sheets

METHOD AND APPARATUS FOR INSPECTING APPEARANCE AND SHAPE OF SUBJECT BODY

BACKGROUND OF THE INVENTION

The present invention relates to a method and an apparatus for inspecting appearance and shape of a subject body such as a tire, a tire component or the like.

A tire, for example, is judged whether it is suitable as a product regarding the circularity and state of the surface such as unevenness, discoloration, contamination, flaws and the like.

Generally, it has been carried out to take a picture of a subject body to obtain appearance data and judge quality of the subject body by a state of the surface decided from the appearance data.

Otherwise, in a tire inspection apparatus disclosed in Japanese Laid-Open Patent Publication Hei 11-138654, a slit light is projected on a tire surface and a picture of the surface is taken by an area camera.

Picture data taken by the area camera are processed by optical cutting method which analyzes a shape with a slit light, and the shape of the tire is re-constituted to be used for judgment of quality of the tire.

However, according to the appearance data taken by the line camera, circularity and unevenness of a surface can not be judged correctly, though discoloration and contamination can be judged, and according to the shape data taken by the area camera, discoloration and contamination can not be judged, though circularity, unevenness of a surface and a flaw can be judged.

If either of the appearance data and the shape data is used, there occurs a delicate borderline case that judgment is difficult so that sometimes a good article is judged as a no-good article and vice versa and accuracy of the judgment is low.

SUMMARY OF THE INVENTION

The present invention has been accomplished in view of the foregoing, and an object of the invention is to provide a method and an apparatus for inspecting appearance and shape of a subject body, in which installation cost and installation space are reduced, working efficiency is superior and judgment accuracy is high.

In order to achieve the above-mentioned object, the present invention provides a method for inspecting appearance and shape of a subject body, comprising: lighting a linear portion of the subject body with a first slit light, taking a picture of the linear portion lighted by the first slit light with a first picture taking means to obtain appearance data, lighting the linear portion with a second slit light, taking a picture of the linear portion lighted by the second slit light with a second picture taking means to obtain shape data, and judging quality of appearance and shape of the subject body based on the appearance data and the shape data.

Since a quality in respect of appearance and shape of a subject body is judged from appearance data and shape data of the same linear portion of the subject body, respective disadvantages of judgments by the appearance data and the shape data are compensated each other. Since appearance data and shape data of the same linear portion are obtained simultaneously, the both data can be compared with each other easily, so that even if judgment is delicate by one of the both data, a clear judgment is possible by comparing the both data with each other and judgment accuracy is improved greatly.

Since the first picture taking means and the second picture taking means take pictures of the same linear portion of the subject body simultaneously, picture taking mechanisms by the line camera and the area camera can be integrated to reduce installation cost and space and maintain high working efficiency.

In the above method for inspecting appearance and shape of a subject body, the second picture taking means may be an area camera.

Shape data for judging unevenness of a surface of the subject body can be obtained by the area camera.

In the above method, the first picture taking means may be a line camera.

Appearance data for judging appearance of a surface of the subject body can be obtained by the line camera.

In the above method, the first picture taking means may be a color line camera.

Appearance data of the subject body can be obtained as color data by the color line camera and quality of the subject body can be judged easily with the colored appearance picture.

In the method, the first picture taking means may be a three color process line camera.

With the three color process line camera, respective appearance data of primary colors BGR can be obtained to facilitate more accurate judgment of the quality.

In the method, wave length of the first slit light and wave length of the second slit light may be different from each other, the first picture taking means may have a filter admitting only the first slit light, and the second picture taking means may have a filter admitting only the second slit light.

Since respective wave lengths of the first and second slit lights are different from each other, the both slit lights are prevented from interfering with each other. And the first and second picture taking means have respective filters admitting only corresponding slit light, so that appearance data and shape data not influenced by each other can be obtained to improve judgment accuracy.

The invention also provides, a method for inspecting appearance and shape of a subject body, comprising: lighting a first linear portion of the subject body with a first slit light, taking a picture of the first linear portion with a first picture taking means to obtain appearance data, lighting a second linear portion slightly shifted from the first linear portion with a second slit light, taking a picture of the second linear portion with a second picture taking means to obtain shape data, the lighting and taking picture of the second linear portion being carried out simultaneously with the lighting and taking picture of the first linear portion, and judging quality of appearance and shape of the subject body based on the appearance data of the first linear portion and the shape data of the second linear portion.

Since the first slit light and the second slit light light different linear portions and the first picture taking means and the second picture taking means take respective corresponding pictures of the linear portions, the first and second picture taking means necessitate no filter for selecting an incident light.

The slight deviation of the position of the second linear portion which is taken a picture by the second picture taking means from the position of the first linear portion which is taken a picture by the first picture taking means, can be corrected by data processing, to obtain appearance data and shape data in respect of the same linear portion which can compensate each other and can be compared with each other. Therefore, a high judgment accuracy can be maintained without mutual interference of the lights.

According to another aspect of the present invention, there is provided an apparatus for inspecting appearance and shape of a subject body, comprising: a first light projecting means for projecting a first slit light onto the subject body, a first picture taking means for taking a picture of a linear portion of the subject body lighted by the first slit light to obtain appearance data, a second light projecting means for projecting a second slit light onto the linear portion of said subject body, a second picture taking means for taking a picture of the linear portion lighted by the second slit light to obtain shape data, and a judgment means for judging quality of appearance and shape of the subject body based on the apparatus data and the shape data.

Since the judgment means judges quality of appearance and shape of the subject body based on the appearance data and the shape data of the same linear portion of the subject body, respective disadvantages of judgments by the appearance data and the shape data are compensated each other. Since appearance data and the shape data of the same linear portion are obtained simultaneously, the both data can be compared with each other easily, so that even if judgment is delicate by one of the both data, a clear judgment is possible by comparing the both data with each other and judgment accuracy is improved greatly.

Since the first picture taking means and the second picture taking means take pictures of the same linear portion of the subject body simultaneously, picture taking mechanisms constituting the first picture taking means and the second picture taking means can be integrated to reduce installation cost and installation space and maintain high working efficiency.

Further, the present invention provides an apparatus for inspecting appearance and shape of a subject body, comprising: a first light projecting means for projecting a first slit light onto the subject body, a first picture taking means for taking a picture of a first linear portion of the subject body lighted by the first slit light to obtain appearance data, a second light projecting means for projecting a second slit light onto a second linear portion of the subject body slightly shifted from the first linear portion, a second picture taking means for taking a picture of the second linear portion lighted by the second slit light to obtain shape data, and a judgment means for judging quality of appearance and shape of the subject body based on the appearance data of the first linear portion and the shape data of the second linear portion.

The first slit light and the second slit light light different linear portions and the first picture taking means and the second picture taking means take respective corresponding pictures of the linear portions, namely the first and second picture taking means admit either one of the first and second slit lights respectively. Therefore, the first and second picture taking means necessitate no filter for distinguishing and selecting a incident light.

The slight deviation of the position of the second linear portion which is taken a picture by the second picture taking means from the position of the first linear portion which is taken a picture by the first picture taking means, can be corrected by data processing, to obtain appearance data and shape data in respect of the same linear portion which can compensate each other and can be compared with each other. Therefore, a high judgment accuracy can be maintained without mutual interference of the lights.

DETAILED DESCRIPTION OF THE PREFERRED EMBODIMENT

Hereinafter, an embodiment of the present invention will be described with reference to FIGS. 1 to 5.

An appearance and shape inspecting apparatus 1 according to the embodiment inspects appearance and shape of a tire T simultaneously and particularly judges quality of an inner surface of the tire T.

Figure 1:
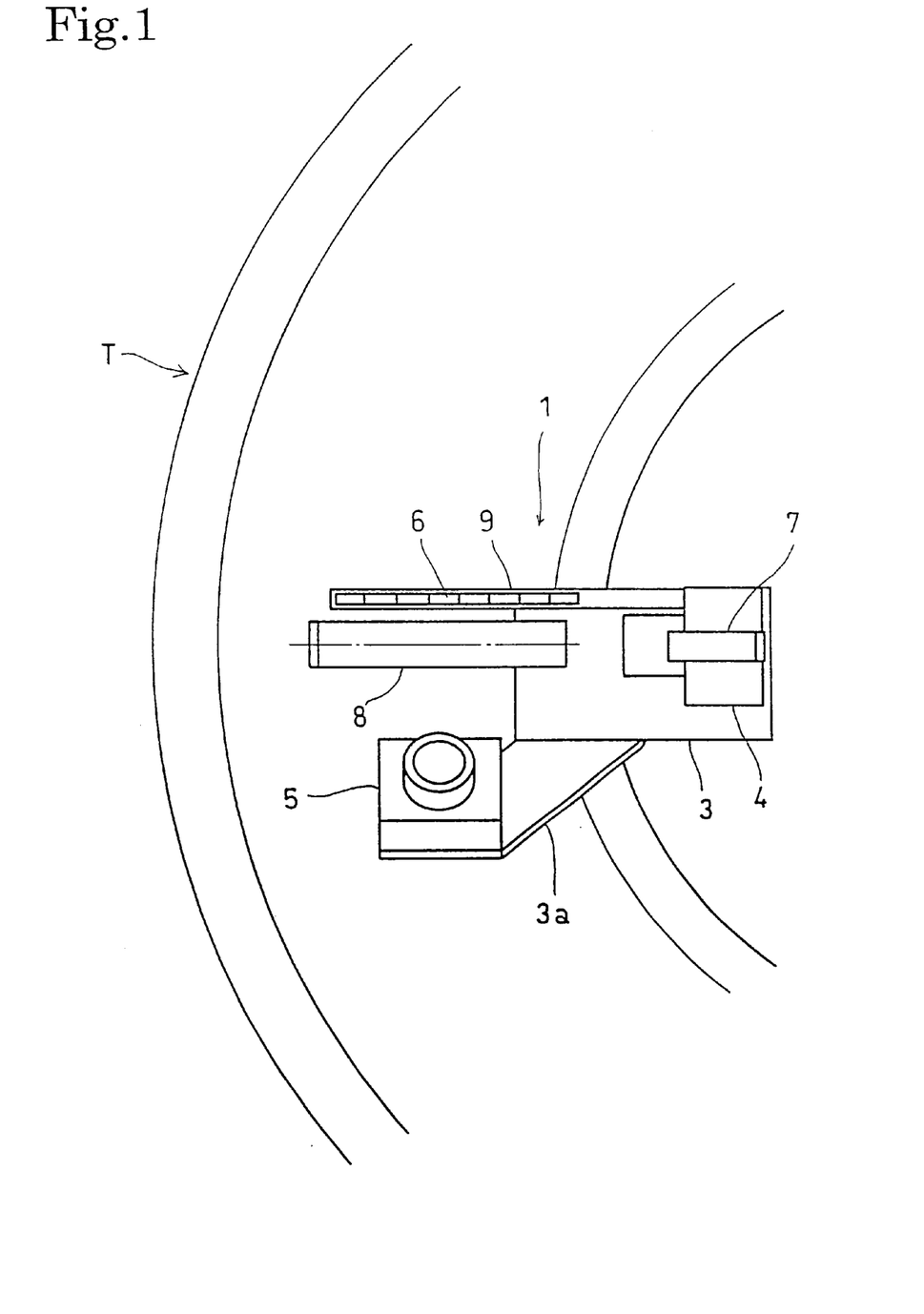
FIG. 1 is a plan view showing a picture taking mechanism of an appearance and shape inspecting apparatus according to an embodiment of the present invention.
Figure 2:
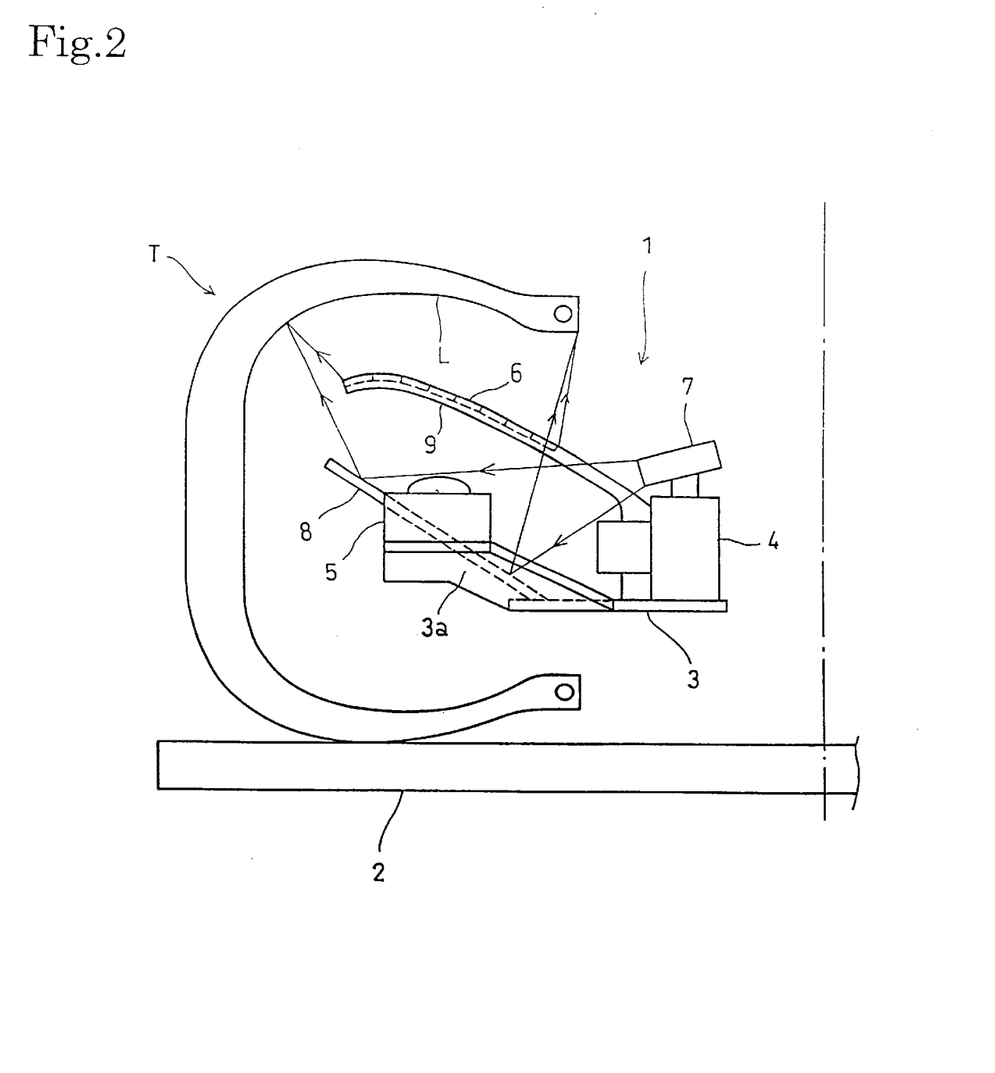
FIG. 2 is a side view of FIG. 1.

A mechanism for taking a picture of the surface of the tire T is shown in FIGS. 1 and 2.

The tire T is placed on a turn table 2 concentrically. A holding frame 3 is hung from above at a central hollow portion of the tire T. On the holding frame 3 are held a line camera (first picture taking means) 4, an area camera (second picture taking means) 5, a line light projector 6 for the line camera, and an area light projector 7 for the area camera intensively to form a set of picture taking mechanism compactly.

The line camera 4 is a CCD camera having picture elements arranged in a row which has a wave length isolating filter capable of selecting a monochromatic slit light of wave length of 680 nm.

On the one hand, the area camera 5 is a CCD camera having picture elements arranged in a plane which has a wave length isolating filter capable of selecting a laser slit right of wave length of 780 nm. Since the shape data are those for judging unevenness of a tire surface, the area camera having picture elements arranged in a plane is used.

The line camera 4 is held on the holding frame 3 at a position nearest a center axis of the tire and has an objective lens directed radially outward in respect of the tire.

The holding frame 3 has an extension arm 3a extending radially outward and obliquely upward for holding the area camera 5. The area camera 5 has an objective lens directed in a specified direction obliquely upward by a specific angle (for example 45 degrees)

A reflex mirror 8 extends from the holding frame 3 radially outward in respect of the tire. The reflex mirror 8 is shaped in a long plate and attached to a portion of the holding frame 3 in front of the line camera 4 directed obliquely upward. Optical axis of the line camera 4 is directed to the mirror surface of the reflex mirror 8 facing obliquely upward.

The area light projector 7 is provided above the line camera 4. The area light projector 7 is a laser projector projecting laser ray of wave length of 780 nm and attached on the line camera 4 so as to project the laser ray toward the reflex mirror 8 in shape of a slit.

The laser ray projected from the area light projector 7 is reflected by the mirror surface of the reflex mirror and lights an inner surface of an upper side-wall between a shoulder section and a bead section of the tire T linearly. The lighted linear portion L is taken a picture by the area camera 5 with a specific angle (45 degrees for example, any angle will do so far as unevenness of the tire surface can be taken).

A bar-like support member 9 extends from a right side position of the holding frame 3 radially outward and obliquely upward. The tip end portion of the bar-like support member 9 is curved gradually to make the slope gentle, so that the support member 9 has a shape extending substantially along the inner surface of the side-wall of the tire T.

On an upper surface of the bar-like support member 9 are arranged a large number of LED, which project monochromatic light of wave length of 680 nm, from a neighborhood of a base end to a tip end in four rows, to constitute the line light projector 6.

The line light projector 6 is disposed near and along the inner surface of the upper side-wall of the tire T, and the monochromatic light projected from the LED lights the linear portion L lighted by the laser ray, in shape of a belt. A part of the monochromatic light reflected at the linear portion is reflected again by the reflex mirror 8 and enters the line camera 4 for picture taking.

The LED arranged on the bar-like support member 9 from the base end side to the tip end is divided into eight or more blocks which can be controlled each. Volume of light projected from each block is adjusted beforehand so that the whole of the linear portion L is lighted with a uniform brightness.

Namely, since the inner surface of the tire T is curved, it is difficult to arrange the LED exactly in parallel with the curved inner surface though the LED are arranged substantially along the curved inner surface, therefore, in order to ensure the uniform lighting, it is necessary that each block is adjusted separately beforehand.

Every block is turned on and light volume of the LED of the block is adjusted so that light volume taken by the line camera 4 becomes a specific suitable volume. After such light volume adjustments in respect to the all blocks are completed, all LED are turned on for measurement.

Figure 3:
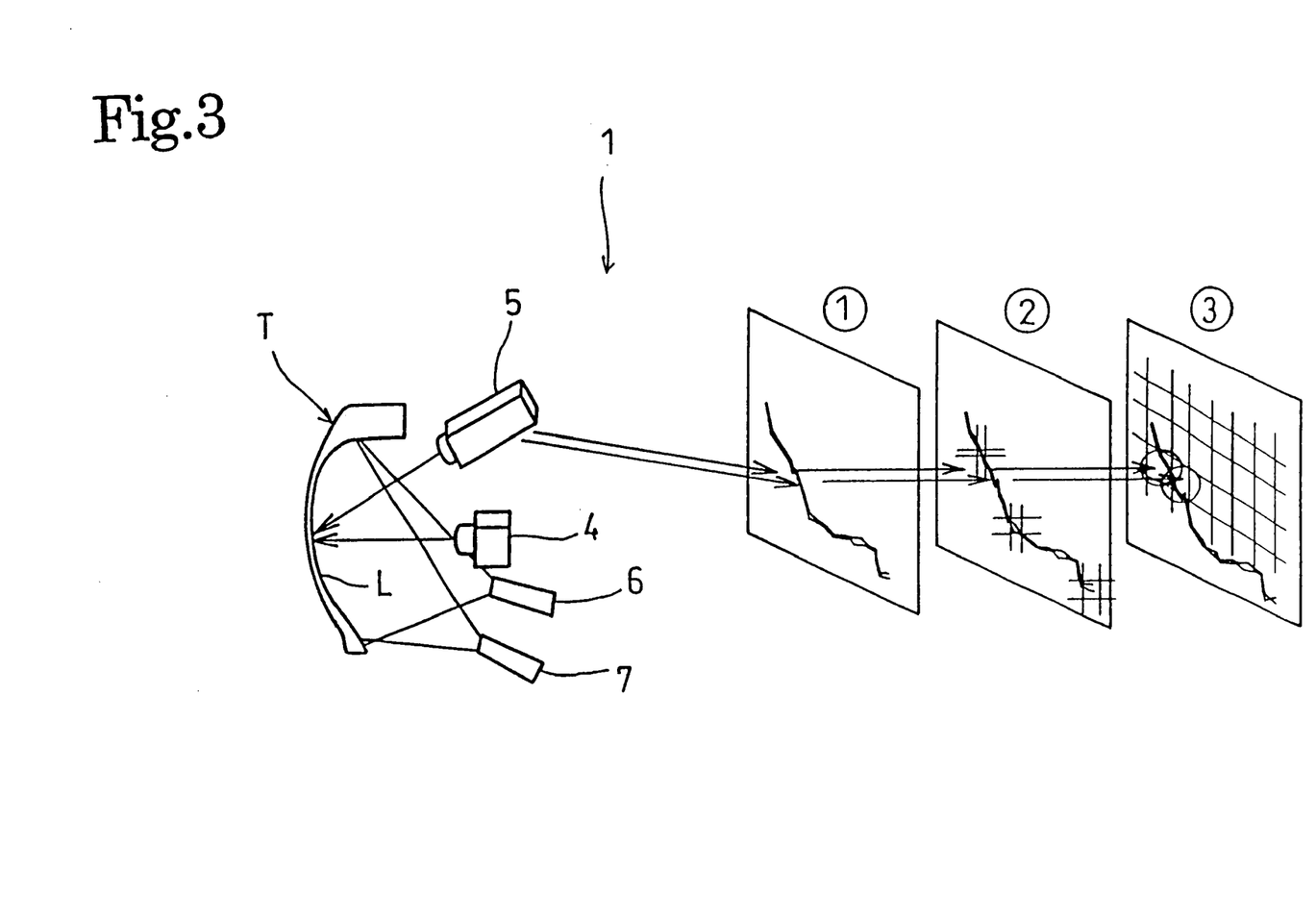
FIG. 3 is a schematic view of the picture taking mechanism.

A set of picture taking mechanism for taking a picture of the surface of the tire T is shown schematically in FIG. 3. The line light projector 6 and the area light projector 7 light the same linear portion L of the inner surface of the tire T. The line camera 4 takes a picture of the linear portion L by the slit monochromatic light projected from the line light projector 6, and simultaneously the area camera 5 takes a picture of the same linear portion L by the slit laser ray projected from the area light projector 7.

The linear portion L lighted by the line light projector 6 and the area light projector 7 in this picture taking mechanism is a part of an inner surface of an upper side-wall of the tire T. The linear portion L is shifted along the inner surface by turning of the tire T, and the inner surface is taken by the line camera 4 and the area camera 5 over the whole circumference.

Figure 6:
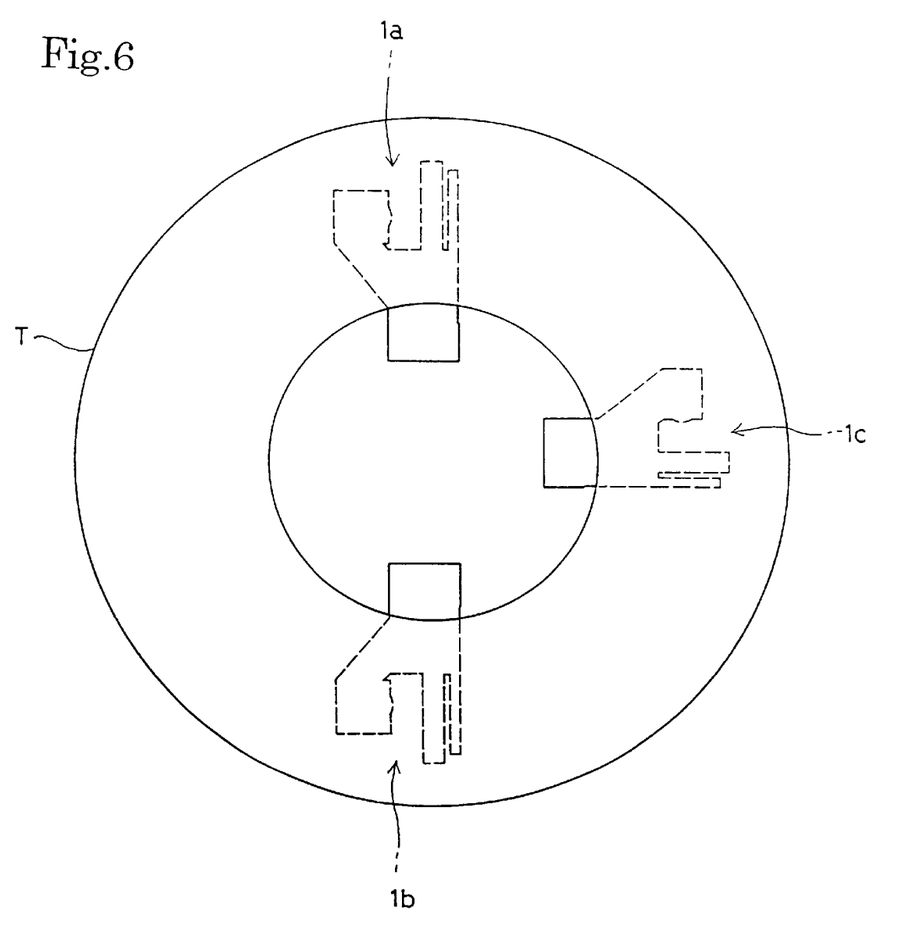
FIG. 6 is a view showing arrangement of three sets of the picture taking mechanisms relative to the tire.

As shown in FIG. 6, in addition to the above-mentioned picture taking mechanism 1a, a picture taking mechanism 1b for an inner surface of lower side-wall and a picture taking mechanism 1c for an inner surface of a tread section are disposed circumferentially at intervals so that pictures in respect of the whole inner surface of the tire T can be taken simultaneously. A set of picture taking mechanism may be moved for taking pictures of the inner surfaces of the upper side-wall, the tread section and the lower side-wall in order for judgment, but it takes much time.

The data obtained by successively taking pictures of the inner surface of the tire T with the line camera 4 is monochromatic appearance data from which an appearance picture of the surface of the tire T is re-constituted as a monochromatic light-and-shade picture. Therefore, discoloration, contamination, a stain and the like can be judged from the appearance picture.

The area camera 5 takes pictures of the linear portions of the inner surface of the turning tire T successively at a predetermined timing, obliquely in a direction of 45 degrees to catch an edge line of the surface of the tire T formed by the slit light as shape data. The shape data are transformed into shape data in a sectional direction of the tire T, and the shape data in respect of the whole circumference of the tire are collected to re-constitute a three dimensional shape picture.

Namely, based on a positional relation between a lighting angle of the slit light projected from the line light projector 6 and an angle for taking the slit picture by the area camera 5, a two dimensional coordinate transformation is carried out geometrically to re-constitute an outer shape (sectional shape) of the tire T at the portion lighted by the slit light. Therefore, circularity, surface unevenness and the like of the tire T can be judged from the outer shape.

Figure 4:
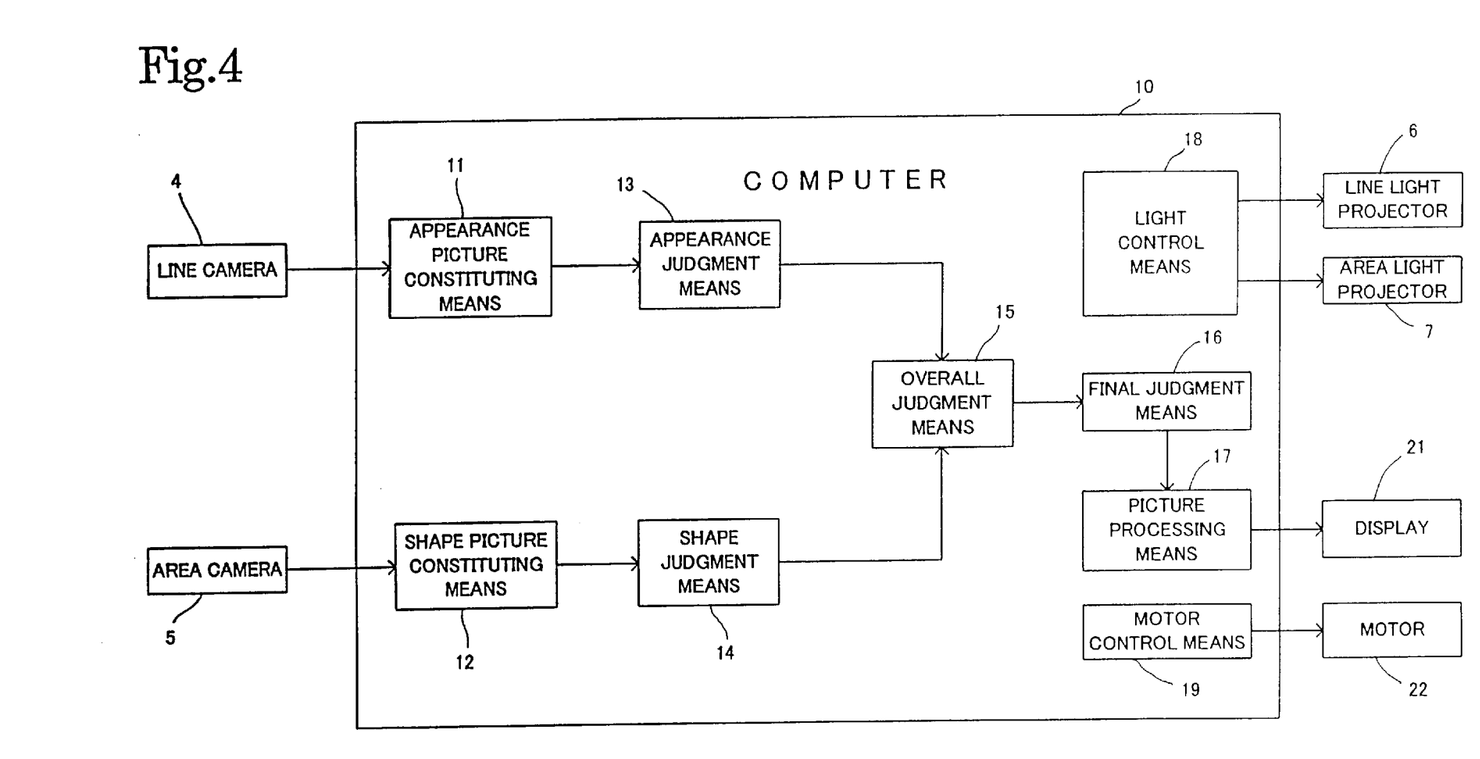
FIG. 4 is a block diagram of a control system of the appearance and shape inspecting apparatus.

The re-constitution of the appearance picture and the shape picture of the tire T, and judgment of quality of the tire T based on the both pictures are processed by a computer. FIG. 4 is a block diagram of the control system.

The computer 10 has an appearance picture constituting means 11 for re-constituting an appearance picture from appearance data inputted from the line camera 4, and a shape picture constituting means 12 for re-constituting a shape picture from shape data inputted from the area camera 5.

The computer 10 has also a light control means for controlling the lights projected from the line light projector 6 and the area light projector 7, a picture processing means 17 for displaying a picture on a display 21, and a motor control means 19 for controlling drive of a motor 22 for turning the turn table 2.

An appearance judgment means 13 judges the quality of appearance on the basis of the appearance picture re-constituted by the appearance picture constituting means 11, a shape judgment means 14 judges the quality of shape on the basis of the shape picture re-constituted by the shape picture constituting means 12, and on the basis of the both judgments, an overall judgment means 15 judges the quality overall.

Further, on the basis of the judgment of the overall judgment means 15, a final judgment means 16 judges the quality of the tire finally. The result of this judgment is displayed on the display 21.

Figure 5:
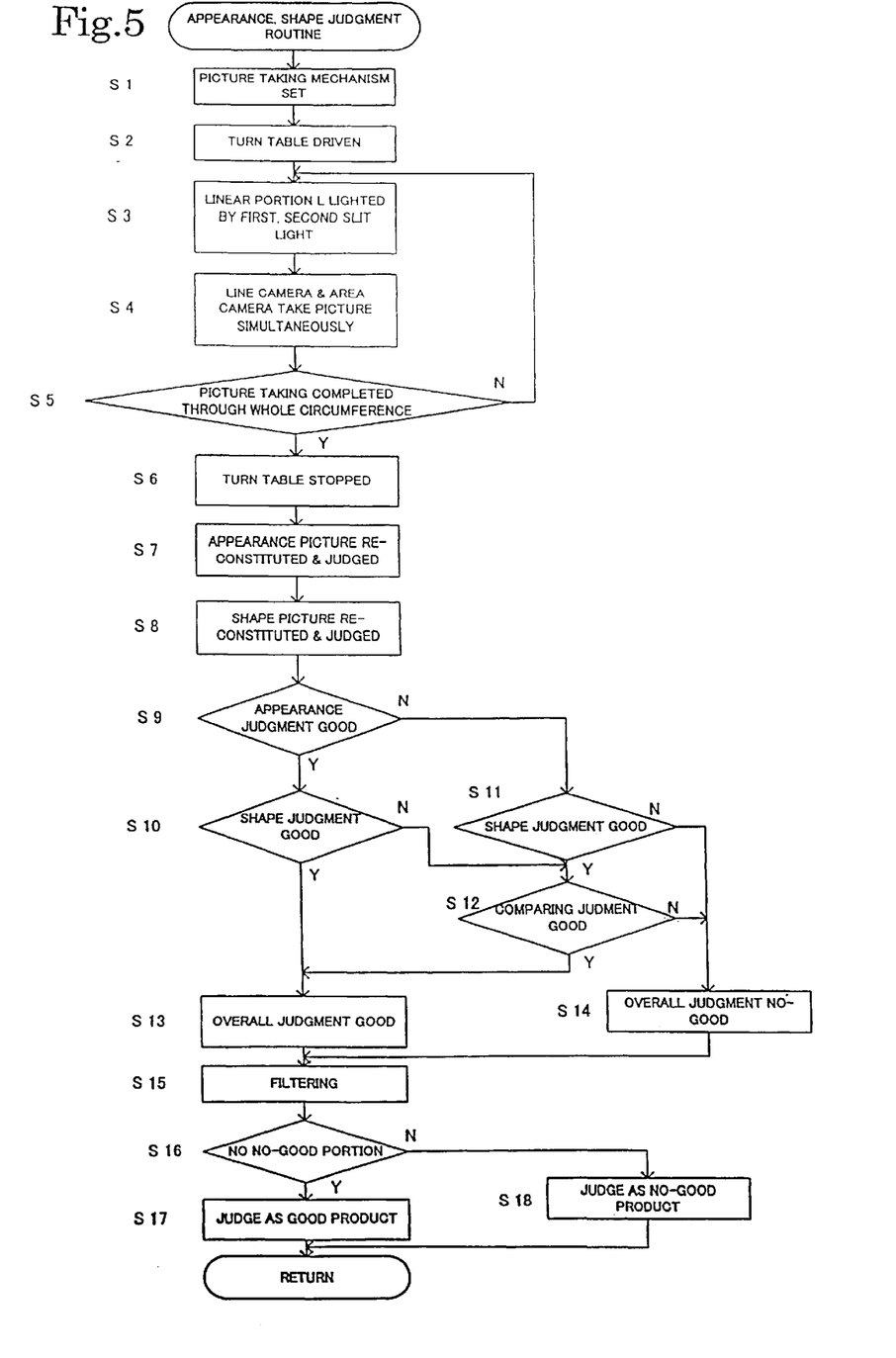
FIG. 5 is a flow chart showing control procedure according to the control system.

FIG. 5 is a flow chart showing a control procedure of the above-mentioned control system by the computer 10.

Firstly, at Step 1, the picture taking mechanism is inserted inside of the tire T placed on a predetermined position of the turn table 2 and fixedly set at a predetermined position.

Next, the turn table 2 is driven to turn and the tire T is turned together with the turn table 2 (Step 2).

Then, the first and second slit lights are projected onto the same linear portion L of inner surface of the tire T by the line light projector 6 and the area light projector 7 (Step 3), and the line camera 4 and the area camera 5 simultaneously take pictures of the same linear portion L by the first slit light and the second slit light, respectively (FIG. 4). The camera for taking the appearance of the tire T to obtain the appearance data may be the area camera in place of the line camera.

At Step 5, it is discriminated whether the inner surface of the tire T has been taken over the whole circumference, and during the picture taking over the whole circumference has not been completed, Steps 3, 4 are repeated. In the meantime, the linear portion L to be taken the picture is shifted by turning of the tire T while the line camera 4 takes the picture continuously and the area camera 5 takes the picture successively at a predetermined timing.

When the picture taking over the whole circumference has been completed, the flow advances from Step 5 to Step 6 and the turn table is stopped.

Then, at Step 7, an appearance picture is re-constituted by the appearance picture constituting means 11 from appearance data taken by the line camera 4, and on the basis of the appearance picture, the quality of appearance is judged by the appearance judgment means 13. For example, if degree of light-and-shade of the appearance picture is within allowable limits, it is judged as "good", and if the degree exceeds the allowable limits, it is judged as "no good" and a mark is applied on the corresponding portion.

At Step 8, a shape picture is re-constituted by the shape picture constituting means 12 from shape data taken by the area camera 5 using the optical cutting method, and on the basis of the shape picture, the quality of appearance is judged by the shape judgement means 14.

Referring to FIG. 3, the above-mentioned shape picture is compared with a standard picture for judgment stored beforehand for every kind of tire (FIG. 3 ①), and if the both pictures coincide with each other, it is judged as "good". If they do not coincide with each other, it is judged whether the error is within an allowable value (FIG. 3 ②), and if the error is within the allowable value, it is judged as "good". If the error exceeds the allowable value, it is judged as "no-good" and a mark is applied on the corresponding portion (FIG. 3 ③).

At Step 9, it is discriminated whether the judgment of the appearance is "good" or "no-good". If "good", the flow advances to Step 10 and if "no-good", the flow advances to Step 11.

At step 10, it is discriminated whether the judgment of shape is "good" or "no-good". If "good", the flow advances to Step 13 and the overall judgment is decided as "good", and if "no-good", the flow advances to Step 12 for carrying out a comparing judgment.

When the judgment of the appearance is "no-good" and the flow advances to Step 11, it is discriminated whether the judgment of shape is "good" or "no-good" at Step 11. If "good", the flow advances to Step 12 for carrying out comparing judgment, and if "no-good", the flow advances to Step 14 where the overall judgment is decided as "no-good".

The comparing judgment at Step 8 is carried out by the overall judgment means 15 so that when either of the appearance judgment and the shape judgment is "no-good", the appearance picture and the shape picture are compared with each other for judging again a portion having been judged as "no-good" by either judgment.

Even if a portion is judged as "no-good" based on either picture, sometimes the portion can be decided as "good" in view of another picture. If it is decided as "good" by the comparing judgment, the flow advances to Step 13 where overall judgment is decided as "good". If it is decided as "no-good" by the comparing judgment, the flow advances to Step 14 where overall judgment is decided as "no-good".

As described above, when both of appearance and shape are judged as "good", the overall judgment is "good" (Steps 9, 10, 13), when both of appearance and shape are judged as "no-good", the overall judgment is "no-good" (Steps 9, 11, 14), and when one of appearance and shape is judged as "good" and another is judged as "no-good", the comparing judgment is carried out (Step 12) for the overall judgment.

The above-mentioned overall judgment is carried out for each of the picture taking mechanisms 1a, 1b, 1c.

After the overall judgment (Steps 13, 14), the flow advances to Step 15 where filtering process is carried out by the final judgment means 16. Namely, for example, only when no-good portions appear at about the same portion continuously several times, it is judged that there is a no-good portion.

By the filtering process, existence of the no-good portion is discriminated (Step 16). If there is no no-good portion, the tire T is judged as a good product (Step 17), and if there is a no-good portion, the tire T is judged as a no-good product (Step 18). This result of judgment is displayed on the display 21 by the picture processing means 17.

As mentioned above, since the quality in respect of appearance and shape of the tire T is judged from appearance data and shape data of the same linear portion of the inner surface of the tire T, respective disadvantages of judgments by the appearance data and the shape data are compensated each other. Since appearance data and shape data of the same linear portion are obtained simultaneously, the both data can be compared with each other easily, so that even if judgment is delicate by one of the both data, a clear judgment is possible by comparing the both data with each other and judgment accuracy is improved greatly.

The line camera 4 and the area camera 5 are held together with the line light projector 6, the area light projector 7 and the reflex mirror 8 intensively as a set of picture taking mechanism so as to take pictures of the same linear portion of the tire T. Therefore, the inspecting apparatus can be made compact, the illustration cost and the illustration space can be reduced, and working efficiency can be maintained high.

A color line camera may be used in place of the line camera 4. In this case, by the color line camera, appearance data of the subject body can be obtained as color data and quality of the tire T can be judged easily by the colored appearance picture.

A three color process line camera may be used in place of the line camera. In the three color process line camera, respective CCD cameras take pictures of every primary color R, G, B. Each appearance datum of every primary color can be obtained to facilitate more accurate judgment of quality of the tire T.

In the above-mentioned embodiment, the line light projector 6 and the area light projector 7 light the same linear portion L of the inner surface of the tire T and the line camera 4 and the area camera 5 take pictures of the same linear portion L by respective slit light. Alternatively, the inspection may be carried out in the manner as that the line camera take a picture of a first linear portion lighted by the line light projector, and the area camera takes a picture of a second linear portion lighted by the area light projector and slightly shifted from the first linear portion.

The slight deviation between the position of the first linear portion which is taken a picture by the line camera and the position of the second linear portion which is taken a picture by the area camera, can be corrected by data processing of the computer to obtain appearance data and shape data in respect of the same linear portion which can be supplemented to each other and compared with each other. Therefore, a high judgment accuracy can be maintained without mutual interference of the lights.

Since the first slit light and the second slit light is projected onto different linear portions and the line camera and the area camera take respective corresponding pictures of the linear portions, the line camera and the area camera necessitate no filter for selecting an incident light.

In the above-mentioned embodiment, appearance and shape of a tire inner surface is inspected. But, as a matter of course, also a tire outer surface can be inspected.

The subject body in the invention is not limited to a tire or a tire component member, but appearance and shape of other various articles can be inspected by the invention.

What is claimed is:

1. A method for inspecting appearance and shape of a subject body, comprising the steps of:

lighting a linear portion of said subject body with a first slit light;

taking a picture of said linear portion lighted by said first slit light with a first picture taking means to obtain appearance data;

lighting said linear portion with a second slit light;

taking a picture of said linear portion lighted by said second slit light with a second picture taking means to obtain shape data; and using a computer judging a quality of appearance and shape of said subject body based on a simultaneous overall processing of both said appearance data and said shape data, wherein the first picture taking means is a line camera having picture elements arranged in a row, and the second picture taking means is an area camera having picture elements arranged in a plane.

2. A method for inspecting appearance and shape of a subject body as claimed in claim 1, wherein said first picture taking means is a color line camera.

3. A method for inspecting appearance and shape of a subject body as claimed in claim 1, wherein said first picture taking means is a three color process line camera.

4. A method for inspecting appearance and shape of a subject body as claimed in claim 1, wherein wave length of said first slit light and wave length of said second slit light are different from each other, said first picture taking means has a filter admitting only said first slit light, and said second picture taking means has a filter admitting only said second slit light.

5. A method for inspecting appearance and shape of a subject body, comprising the steps of:

lighting a first linear portion of said subject body with a first slit light;

taking a picture of said first linear portion with a first picture taking means to obtain appearance data;

lighting a second linear portion slightly shifted from said first linear portion with a second slit light;

taking a picture of said second linear portion with a second picture taking means to obtain shape data;

the steps of lighting and taking picture of said second linear portion being carried out simultaneously with the steps of lighting and taking picture of said first linear portion; and using a computer judging quality of appearance and shape of said subject body based on a simultaneously overall processing of both said appearance data of said first linear portion and said shape data of said second linear portion, wherein the first picture taking means is a line camera having picture elements arranged in a row, and the second picture taking means is an area camera having picture elements arranged in a plane.

6. An apparatus for inspecting appearance and shape of a subject body, comprising:

first light projecting means for projecting a first slit light onto said subject body;

first picture taking means for taking a picture of a linear portion of said subject body lighted by said first slit light to obtain appearance data;

second light projecting means for projecting a second slit light onto said linear portion of said subject body;

second picture taking means for taking a picture of said linear portion lighted by said second slit light to obtain shape data; and computer judgement means for judging quality of appearance and shape of said subject body based on a simultaneous overall computer processing of both said appearance data and said shape data, wherein the first picture taking means is a line camera having picture elements arranged in a row, and the second picture taking means is an area camera having picture elements arranged in a plane.

7. An apparatus for inspecting appearance and shape of a subject body, comprising:

first light projecting means for projecting a first slit light onto said subject body;

first picture taking means for taking a picture of a first linear portion of the subject body lighted by said first slit light to obtain appearance data;

second light projecting means for projecting a second slit light on to a second linear portion of said subject body slightly shifted from said first linear portion;

second picture taking means for taking a picture of said second linear portion lighted by said second slit light to obtain shape data; and computer judgement means for judging quality of appearance and shape of said subject body based on a simultaneous overall computer processing of both said appearance data of said first linear portion and said shape data of said second linear portion, wherein the first picture taking means is a line camera having picture elements arranged in a row, and the second picture taking means is an area camera having picture elements arranged in a plane.

* * * * *